United States Patent [19]

Hoffman et al.

[11] Patent Number: 4,880,266

[45] Date of Patent: Nov. 14, 1989

[54] VEHICLE ASH TRAY

[76] Inventors: John N. Hoffman, 10450 Laramie Ave., Chatsworth, Calif. 91311; Bruce J. Greenbaum, 177 S. Westgate Ave., Los Angeles, Calif. 90049

[21] Appl. No.: 215,350

[22] Filed: Jul. 5, 1988

[51] Int. Cl.$^4$ .............................................. B60N 3/12
[52] U.S. Cl. .................................... 296/37.9; 224/280
[58] Field of Search .................. 296/37.9, 37.11, 37.13, 296/37.15; 224/280 X, 281, 42.42 R

[56] References Cited

U.S. PATENT DOCUMENTS

| 1,740,514 | 12/1929 | Kimball | 296/37.9 |
| 1,802,947 | 4/1931 | Kimball | 224/280 |
| 3,332,254 | 7/1969 | Corbin | 296/37.9 |

Primary Examiner—Robert R. Song

[57] ABSTRACT

An improved ash tray for use in vehicles having armrests with "fire boxes" therein which are covered by escutheons provided with detents for resiliently retaining the ash tray therein and which detents have become bent or damaged; said ash tray comprising a receptacle portion, a cover portion, and a generally U-shaped insert member, formed of spring steel or the like, having a crosspiece having a pair of resilient legs extending outward and downward from the upper edge of the crosspiece adjacent respective ends thereof. The U-shaped insert member is clamped between the cover portion and the rim of the receptacle portion so that the crosspiece lies within the receptacle, while the legs lie outside of the receptacle portion in position to engage the edge of the escutcheon opening and to resiliently retain the ash tray in position.

7 Claims, 3 Drawing Sheets

VEHICLE ASH TRAY

BACKGROUND

1. Field of the Invention

This invention relates to receptacles and is particularly directed to receptacles, such as ash trays, for use in vehicles, such as aircraft, buses and the like.

2. Prior Art

People have been smoking cigarettes and the like for about two hundred years, whereas the development of vehicles, such as motor buses and airplanes has occurred only within this century. Consequently, it has been necessary or desireable to provide ash trays in such vehicles, especially in commercial vehicles which are designed to carry large numbers of people. Fortunately, due to increased recognition of the health hazards involved in smoking, most people have now given up this habit. However, the number of people who continue to smoke is still significant. Therefore, means must still be provided for disposal of hot ashes and butts resulting from such use.

It has been found convenient to mount vehicle ash trays within the armrests of the vehicle seats. However, this location is not without complication, since it is also desirable to provide upholstered and padded armrests which can present serious fire hazards. In view of this, it has become a federal requirement, at least on commercial vehicles, that a fireproof or highly fire resistant "fire box" be provided in the armrest about the area where the ash tray is to be mounted. This "fire box" is covered by a metal escutcheon which serves to suspend the ash tray spaced from the walls of the "fire box" for safety purposes and also serves a decorative function. Since the capacity of such ash trays is necessarily limited and since the number of potential users on commercial vehicles is extremely large, it is customary for cleaning personnel to frequently remove and empty the ash trays. Therefore, it is customary to design the ash trays to be removeably mounted in an opening in the escutcheon and to provide a resilient detent on the escutcheon adjacent the opening and to form the ash trays with a recess to mate with this detent to resiliently retain the ash trays in position. Unfortunately, for durability, it is necessary to form the escutcheon of metal which is relatively hard and brittle. Consequently, with repeated removal and remounting of the ash trays, these detents often become broken or bent out of useful positions or lose their resiliency and allow the ash trays to merely sit loosely in the opening of the escutcheon. However, the armrests are frequently pivoted to permit folding them out of the way between adjacent seats and, if the ash trays are not securely retained, they are liable to drop out of the escutcheon, when the armrest is raised, and may dump their contents on the floor, the next seat or on a passenger sitting in that seat. This obviously, presents serious risk of fire hazard and injury.

Several prior art attempts have been made to overcome this problem. Thus, where the escutcheon detent has become weakened or useless, one solution has been to provide a U-shaped member, formed of spring steel, having a crosspiece which could be riveted or otherwise secured to the ash tray adjacent the detent mating recess and having a pair of arms extending upwardly and outwardly to engage the escutcheon and resiliently retain the ash tray in the desired location. Unfortunately, where the escutcheon detent is still partially or completely present, it often becomes jammed against the crosspiece of such a U-shaped member and prevents all subsequent attempts at removal of the ash tray. Thus, none of the prior art attempts to solve the problem of bent or damaged detents have been entirely satisfactory.

BRIEF SUMMARY AND OBJECTS OF INVENTION

These disadvantages of the prior art are overcome with the present invention and ash trays are provided which can easily be mounted in or removed from escutcheon openings as often as desired, regardless of the condition or absence of the detent.

Vehicle ash trays conventionally comprise a receptacle portion which extends into the interior of the "fire box" and which actually retains the ashes etc. and a cover portion having peripheral flanges which overlie the adjacent edges of the escutcheon opening to support the ash tray therein and are formed with a central opening having a lid pivotally secured thereto to permit opening and closing of access to the receptacle portion. The present invention contemplates providing a generally U-shaped insert member, formed of spring steel or the like, having a crosspiece having a pair of resilient legs extending outward and downward from the upper edge of the crosspiece adjacent respective ends thereof. The U-shaped insert member is clamped between the cover portion and the rim of the receptacle portion so that the crosspiece lies within the receptacle, while the legs lie outside of the receptacle portion in position to engage the edge of the escutcheon opening and to resiliently retain the ash tray in position.

Accordingly, it is an object of the present invention to provide an improved ash tray.

Another object of the present invention is to provide an improved ash tray for use in vehicles having armrests with "fire boxes" therein which are covered by escutcheons.

A further object of the present invention is to provide an improved ash tray for use in vehicles having armrests with "fire boxes" therein which are covered by escutcheons provided with detents for resiliently retaining the ash tray therein and which detents have become bent or damaged.

A specific object of the present invention is to provide an improved ash tray for use in vehicles having armrests with "fire boxes" therein which are covered by escutcheons provided with detents for resiliently retaining the ash tray therein and which detents have become bent or damaged; said ash tray comprising a receptacle portion, a cover portion, and a generally U-shaped insert member, formed of spring steel or the like, having a crosspiece having a pair of resilient legs extending outward and downward from the upper edge of the crosspiece adjacent respective ends thereof. The U-shaped insert member is clamped between the cover portion and the rim of the receptacle portion so that the crosspiece lies within the receptacle, while the legs lie outside of the receptacle portion in position to engage the edge of the escutcheon opening and to resiliently retain the ash tray in position.

These and other objects and features of the present invention will be apparent from the following detailed description, taken with reference to the accompanying drawing.

DETAILED DESCRIPTION OF THE INVENTION

Figure 1:
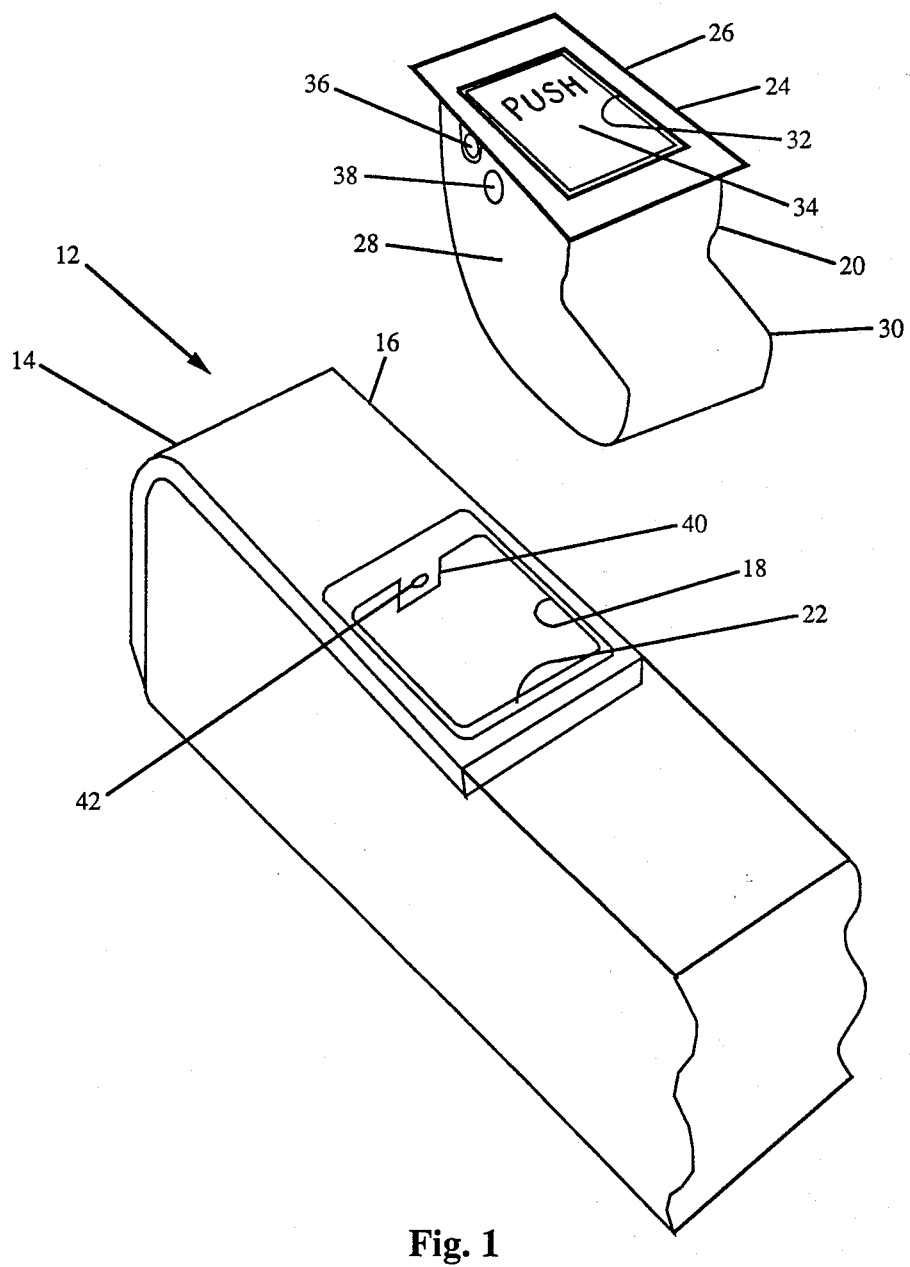
FIG. 1 is a exploded isometric view showing a vehicle armrest having an escutcheon together with an ash tray mountable within the opening of the escutcheon.

FIG. 1 shows a vehicle armrest, indicated generally at 12, having a "fire box", not shown, located adjacent the forward end 14 of the armrest 12 and covered by an escutcheon 16. Conventionally, the armrest 12 will have a metal frame covered by suitable padding and upholstery and the escutcheon 16 will be formed of a metal having a decorative surface, such as stainless steel or chrome. The escutcheon provides a cover for the "fire box" and forms a decorative and wear resistant end for the armrest 12. Also, the escutcheon 16 is formed with an opening 18 to permit mounting an ash tray, as seen at 20, in spaced relation with the walls of the "fire box". A recessed flange 22 extends about the periphery of the opening 18 to receive the edge 24 of the cover 26 of the ash tray 20 which projects outwardly beyond the side walls 28 of the receptacle portion 30 of the ash tray 20, while the receptacle portion 30 of the ash tray 20 projects through the opening 18 of the escutcheon 12 so as to be suspended within the "fire box" underneath the escutcheon 16. The cover 26 of the ash tray 20 is formed with an opening 32 and a lid 34 is pivotally mounted therein, as by rivets 36, so that the lid 34 may be opened to provide access to the interior of the receptacle portion 30 of the ash tray 20 or may be closed to provide a smooth surface and to prevent smoke, ashes and the like from escaping from the receptacle portion 30 of the ash tray 20. Similarly, the cover 26 is secured to the receptacle portion 30 of the ash tray 20 by suitable means, such as rivets 38. To permit easy mounting and removal of the ash tray 20 and to resiliently retain the ash tray 20 in the escutcheon 16, the forward edge of the flange 22 is formed with a detent 40 which projects downwardly from the flange 22 and is formed with a knob 42 for engaging and resiliently retaining the ash tray 20 within the escutcheon 16.

Figure 2:
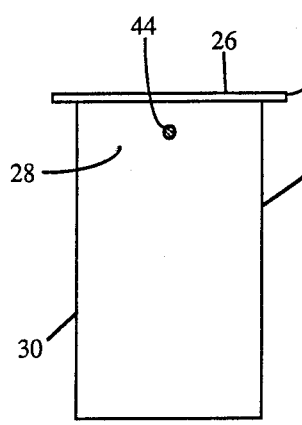
FIG. 2 is a front elevation of a prior art ash tray for use with the vehicle armrest of FIG. 1.

As seen in FIG. 2, the original equipment ash trays 20 of the prior art have been formed with a hole or recess 44 for mating with the knob 42 of the detent 40 on the escutcheon 16. Unfortunately, as noted above, the escutcheon 16 is conventionally formed of a metal, such as stainless steel, aluminum or chrome, which is decorative and wear resistant. However, such metals tend to be relatively brittle and nonresilient. Consequently, with repeated mounting and removal of the ash tray 20, as is required in normal usage, the detent 40 tends to become bent or broken, so that the knob 42 of the detent 40 fails to engage the recess 44 of the ash tray 20. This permits the ash tray 20 to be slid into or out of the escutcheon 16 without restraint. Hence, if the armrest 12 is raised, the ash tray 20 may be ejected onto the passenger or seat behind, causing certain annoyance and possible injury or fire hazard.

Figure 3:
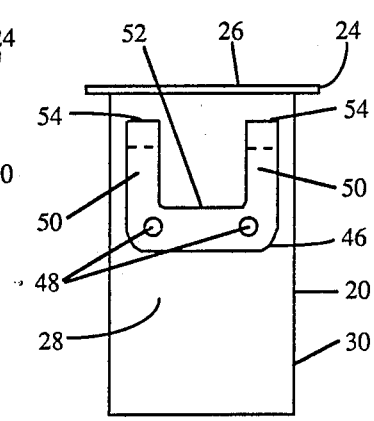
FIG. 3 is a view similar to that of FIG. 2 showing an alternative prior art ash tray for use with the vehicle armrest of FIG. 1.

To overcome this problem, the prior art has proposed the structure shown in FIG. 3, wherein a generally U-shaped member 46 is secured to the side wall 28 of the receptacle portion 30 of the ash tray 20 by suitable means, such as rivets 48. The U-shaped member 46 is formed of resilient metal, such as spring steel, and is provided with a pair of arms 50 which extend upwardly and outwardly from the crosspiece 52 and terminate in inwardly projecting tips 54. In use, when the ash tray 20 is inserted into the opening 18 of the escutcheon 16, the tips 54 of the arms 50 resiliently engage the underside of the flange 22 of the escutcheon 16 to resiliently retain the ash tray 20 in its mounted position. When it is desired to remove the ash tray 20, the tips 54 serve to cam the arms 50 of the U-shaped member 46 inwardly to permit release of the ash tray 20 from the escutcheon. Unfortunately, with this structure, it frequently happens that the detent 40 can become jammed against the crosspiece 52 of the U-shaped member 46. When this occurs, it prevents removal of the ash tray 20. Thereafter, the ash tray 20 can only be removed by disassembling the escutcheon 16 from the armrest 12, which involves considerable waste of expensive time and labor.

Figure 4:
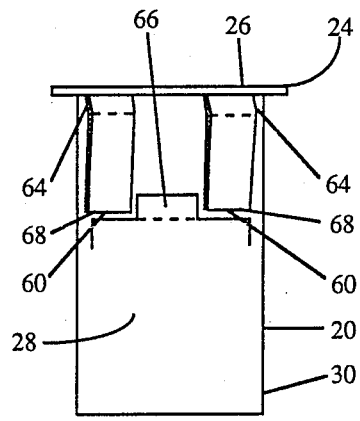
FIG. 4 is a view similar to that of FIG. 2 showing an ash tray embodying the present invention.
Figure 5:
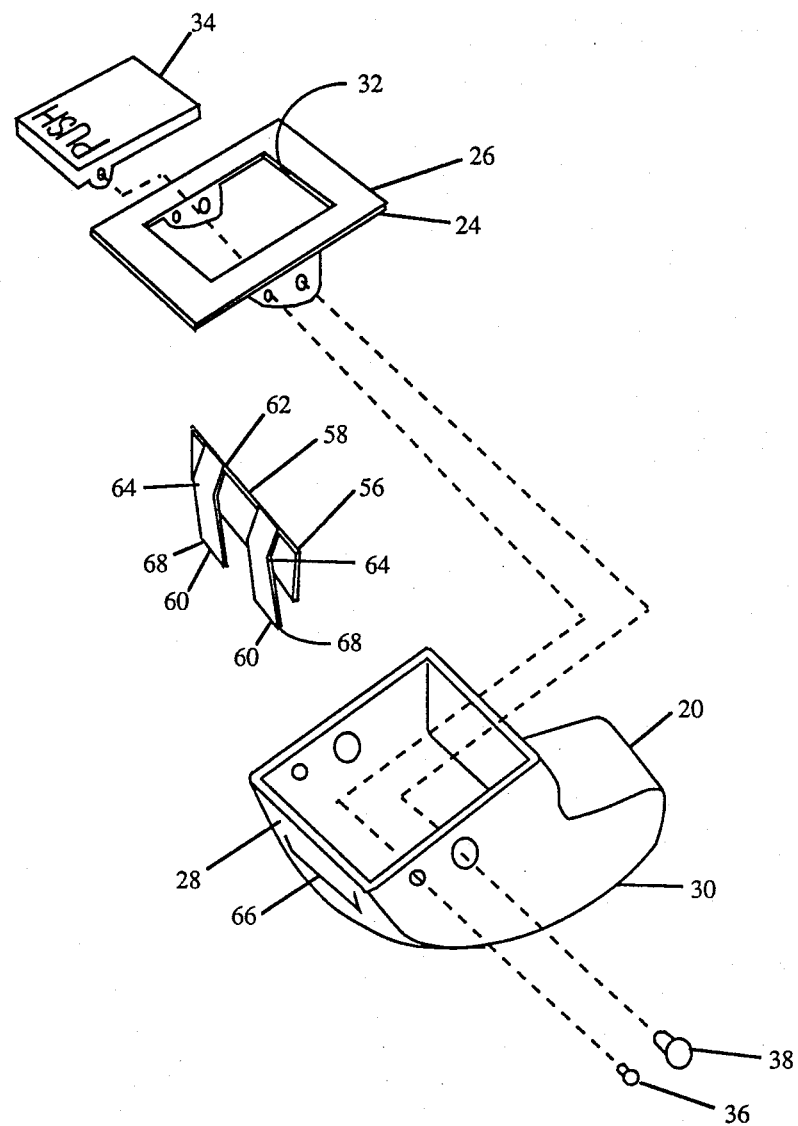
FIG. 5 is an exploded view of the ash tray of FIG. 4.

To overcome these problems of the prior art, the present invention proposes the structure of FIGS. 4 and 5. In accordance with the present invention, a generally U-shaped insert member 56 is provided having a crosspiece 58 with a pair of legs 60 which project outwardly and downwardly from the upper edge 62 of the cross piece 58. The insert member 56 is assembled to the ash tray 20 by placing the crosspiece 58 inside the receptacle portion 30 of the ash tray 20 with the legs 60 extending downwardly outside of the side walls 28 of the receptacle portion 30, as best seen in FIG. 4. Thereafter, when the cover 26 of the ash tray 20 is secured to the receptacle portion 30 by rivets 38, the u-shaped insert member 56 will be clamped in place between the cover 26 and the upper edge of the side wall 28 of the receptacle portion 30 of the ash tray 20. In use, the upper portions 64 of the legs 60 will bear against the underside of the flange 22 of the escutcheon 16 to resiliently retain the ash tray 20 is its mounted position and, when it is desired to remove the ash tray 20, the upper portions 64 of the legs 60 will serve to cam the legs 60 inwardly to permit release of the ash tray 20. Obviously, with the structure of the present invention, there is nothing which could engage the detent 40 of the escutcheon and, hence, the device of the present invention cannot become jammed by the detent 40. However, as a further precaution against such jamming, the surface of the side wall 28 of the receptacle 30 of the ash tray 20 may be provided with a bevelled surface, as seen at 66 in FIGS. 4 and 5, which will, if engaged by the detent 40, will serve to cam the detent 40 outwardly to facilitate release of the ash tray 20 from the escutcheon 16. Furthermore, the ends 68 of the legs 60 may be curved inwardly so as to rest on the bevelled surface 66 and to form a smooth continuation of the curvature of the side wall 28 of the receptacle portion 30 of the ash tray 20 so as to facilitate insertion and removal of the ash tray 20 with the escutcheon 16.

Obviously, numerous variations and modifications can be made without departing from the spirit of the present invention. Therefore, it should be clearly understood that the forms of the present invention described above and shown in the figures of the accompanying drawings are illustrative only and are not intended to limit the scope of the present invention.

We claim:

1. A vehicle ash tray comprising:
   a receptacle portion for receiving ashes and the like,
   a cover member secured to the upper end of said receptacle member and having an edge projecting beyond the side wall of said receptacle to suspend said receptacle within the opening of a vehicle seat escutcheon, and
   an insert member clamped between said cover member and the upper edge of said receptacle having a pair of legs projecting outwardly and downwardly outside of said receptacle and engageable with said escutcheon when said ash tray is inserted into the opening of said escutcheon to resiliently retain said ash tray in the desired position, said insert member being generally U-shaped, having a crosspiece and having said legs projecting outwardly and downwardly from the upper edge of said crosspiece.

2. The ash tray of claim 1 wherein:
   said crosspiece of said insert member lies inside of said receptacle while said legs extend downwardly outside of said receptacle.

3. The ash tray of claim 2 wherein:
   the exterior surface of said receptacle is bevelled and the tips of the legs of said insert member lie adjacent said bevel in a manner such that said legs cooperate with said bevel to provide a continuous smooth surface with the surface of said receptacle below said bevel.

4. In a vehicle ash tray having a receptacle portion for receiving ashes and the like, and a cover member secured to the upper end of said receptacle member formed with an edge projecting beyond the side wall of said receptacle to suspend said receptacle within the opening of a vehicle seat escutcheon; the improvement comprising:
   an insert member clampable between said cover member and said receptacle to releasably retain said ash tray in mounted position within the opening of said escutcheon, said insert member being generally U-shaped, having a crosspiece and having a pair of legs projecting outwardly and downwardly from the upper edge of said crosspiece.

5. A vehicle ash tray comprising:
   a receptacle portion for receiving ashes and the like,
   a cover member secured to the upper end of said receptacle member and having an edge projecting beyond the side wall of said receptacle to suspend said receptacle within the opening of a vehicle seat escutcheon, and
   an insert member clamped between said cover member and the upper edge of said receptacle having at least one leg projecting outwardly and downwardly outside of said receptacle and engageable with said escutcheon when said ash tray is inserted into the opening of said escutcheon to resiliently retain said ash tray in the desired position, said insert member having a crosspiece and having said leg projecting outwardly and downwardly from the upper edge of said crosspiece.

6. The vehicle ash tray of claim 5 wherein:
   the exterior surface of said receptacle is bevelled and the tip of the leg of said insert member lies adjacent said bevel in a manner such that said leg cooperates with said bevel to provide a continuous smooth surface with the surface of said receptacle below said bevel.

7. In a vehicle ash tray having a receptacle portion for receiving ashes and the like, and a cover member secured to the upper end of said receptacle member formed with an edge projecting beyond the side wall of said receptacle to suspend said receptacle within the opening of a vehicle seat escutcheon; the improvement comprising:
   an insert member clampable between said cover member and said receptacle to releasably retain said ash tray in mounted position within the opening of said escutcheon, said insert member having a crosspiece and at least one leg projecting outwardly and downwardly from the upper edge of said crosspiece.

* * * * *